United States Patent

[11] 3,560,714

| [72] | Inventor | Bruce A. McDonald<br>1016 Middle Ave. Apt 3, Menlo Park, Calif. 94025 |
|---|---|---|
| [21] | Appl. No. | 751,206 |
| [22] | Filed | Aug. 8, 1968 |
| [45] | Patented | Feb. 2, 1971 |

[54] ELECTRICALLY HEATED COFFEE POT
11 Claims, 2 Drawing Figs.

[52] U.S. Cl. .................................................. 219/502
[51] Int. Cl. .................................................. H05b 1/02
[50] Field of Search .......................................... 99/236,
285, 330, 341, 342, 281—283; 250/218, 201, 206, 215; 356/180; 219/443, 502

[56] References Cited
UNITED STATES PATENTS

| 2,502,844 | 4/1950 | Hildreth ....................... | 99/282 |
| 3,319,514 | 5/1967 | McAllister ..................... | 250/218 |

*Primary Examiner*—Bernard A. Gilheany
*Assistant Examiner*—F. E. Bell
*Attorney*—Charles L. Botsford ABSTRACT: This invention relates to coffee pots; more particularly, to a coffee pot that is heated by electricity; still more particularly, to an electrically heated coffee pot whose heat is controlled by means of light passing through coffee as it is being made.

PATENTED FEB 2 1971

3,560,714

INVENTOR
BRUCE A. McDONALD 3,560,714

ELECTRICALLY HEATED COFFEE POT

This invention consists of a hollow base having a vertically disposed portion at one end thereof that has its upper end terminating in a horizontally disposed portion having a recess therein. The aforesaid base is provided with a horizontally disposed removable flat top on which is placed a coffee pot, such as a Pyrex coffee pot or equivalent. The contents of the aforesaid coffee pot are heated by an electric heating element. The heating element is connected by electric wires to two electric switches and an electric bulb and controlled circuitry as well as a source of electricity that projects a beam of light through a hollow member of the aforesaid Pyrex coffee pot onto a photocell. When the liquid coffee that is being brewed in the aforesaid coffee pot reaches a certain density in color, the electric current to the aforesaid heating element will automatically be cut off, thus making coffee of a desired and predetermined taste and strength in a minimum of time.

It is the principal object of this invention to provide an electrically heated coffee pot whose heat is controlled by light from an electric bulb passing through coffee in the pot and effecting a light detector that is connected into the control circuitry of the heating element.

Another object of this invention is to provide an electrically heated coffee pot of the character herein described whose coffee strength is predetermined by means of one of the controls of this invention rather than by the usual methods known to those experienced in the art of making coffee.

Still another object of this invention is to provide an electrically heated coffee pot of the character herein described that has a minimum number of components, any of which can easily be repaired or replaced by anyone who can handle a screwdriver or pliers.

Further objects and advantages of this invention will no doubt become apparent as perusal of this specification and its appended claims is made and the accompanying drawing is examined.

Figures 1, 2:
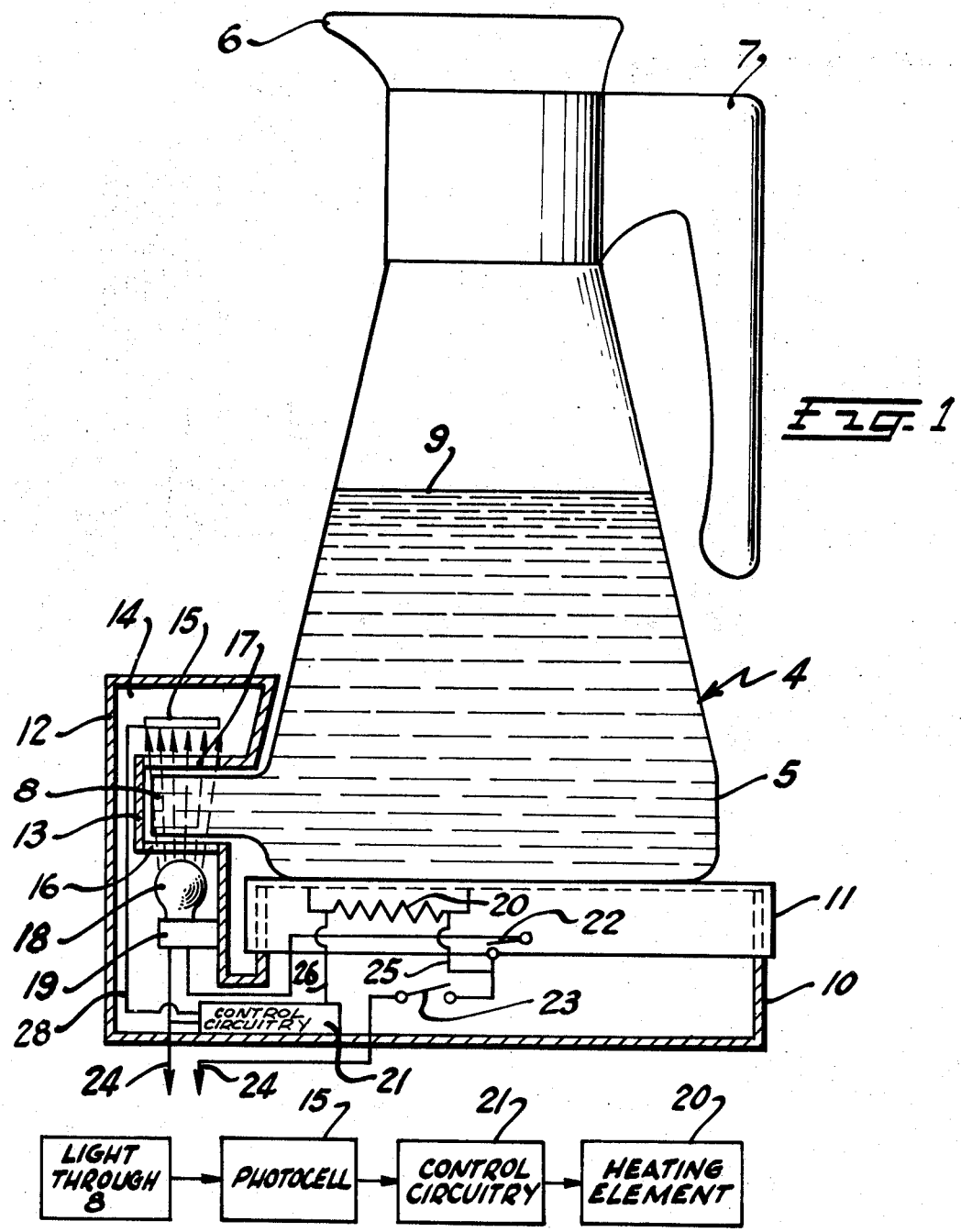
FIG. 1 is a side view of this invention, showing its base in cross section and its electric circuit in diagrammatic form.
FIG. 2 is a block diagram of the electric circuit of this invention.

This invention of an electrically heated coffee pot is indicated in its entirety in the accompanying drawing by the reference number 4.

The invention consists of a Pyrex coffee pot 5, having a pouring lip 6, and a heatproof handle 7. The Pyrex coffee pot 5 has a hollow member 8 projecting outward from one side thereof. The coffee 9 in the pot will flow in and out of the hollow member since the hollow member is integral with the pot. This one can see on examination of FIG. 1 of the drawing.

A hollow base 10 provides a container for all of the electric components of this invention. The aforesaid base 10 embodies a removable flat top 11 on which the previously mentioned coffee pot 5 rests when coffee is being made. The hollow base 10 embodies a vertically disposed portion 12 on one side thereof that has a horizontally disposed U-shaped recess 13 therein in which is placed the aforesaid hollow member 8 of the coffee pot 5 when coffee is being made by means of this invention. A hollow chamber 14 in the top of the aforesaid vertically disposed portion 12 provides space for the photocell 15 to which light flows through the two clear spaced and parallel glass lens 16 and 17. The hollow chamber 14 functions to shield the photocell 15 from external light, so that changes in the environmental light do not affect the accuracy of the photodetector in detecting changes in transmittancy of the liquid in the container. Lens 16 is located below the aforesaid hollow member 8 of the coffee pot 5; lens 17 is located directly above the same member 8, as one can see by looking at FIG. 1 of the accompanying drawing.

If one so desires, the aforesaid lens 16 and lens 17 may be left out of the invention in so long as there is spaced and parallel openings for the light from the electric bulb 18 to shine through onto the aforesaid photocell 15. However, the inclusion of the lens will prevent dust and dirt from entering the hollow base 10 of the invention.

Continuing to look at the drawing, it will be seen that an electric bulb 18 is located in the socket 19 that is mounted directly below the aforesaid lens 16. A horizontally disposed electric heating element 20 is located in the top of the aforesaid hollow base 10 in which is also located the controlled circuitry 21. Two electric switches of the single pole type are mounted in the side of the hollow base 10. One switch is indicated by the reference number 22 while the other switch is likewise indicated by the reference number 23.

Having now described the construction of this invention of mine, I now describe its operation and the electric circuit as follows:

Any desired amount of ground coffee is placed in water in the coffee pot 5 which is placed on top of the removable float top 11 of the hollow base 10 from which outwardly projects two electric wires 24 whose outer ends are provided with a suitable plug for connecting the invention to a source of electricity. This connection is now made. This invention is so constructed that the weight of the aforesaid coffee pot 5 with water therein will automatically close the switch 22. Switch 23, having already been placed in the "on" position, will permit the electricity to flow through the electric circuit and thus turn on the electric bulb 18 where its light rays will shine up through the lens 16, the hollow member 8 which has the water with the ground coffee therein, and on up through lens 17 to activate the photocell 15. While the light from the electric bulb 18 is not diminished by shining through the clear water in the often mentioned hollow member 8 of the coffee pot 5, the light will be diminished as the coffee is dissolved by the water which is heated by the aforesaid electric heating element 20. The just mentioned heating element 20 has one terminal connected by wire 25 to the two electric switches 22 and 23, while the other terminal of the heating element is connected by wire 26 to the aforesaid control circuitry 21 from which extends one of the two wires of the aforesaid wires 24. A wire 27 connects the other side of the aforesaid switch 22 with one of the terminals of the electric bulb 18 while the other terminal of the same bulb is connected to one of the aforesaid wires 24 as well as to the aforesaid control circuitry 21 from which a wire 28 is connected to the already mentioned photocell 15. It is now obvious from the just described electric circuit of this invention that when the coffee 9 reaches a predetermined density that can be translated in terms of the strength of the brew, the electric current to the aforesaid heating element 20 will be shut off by reason of the lack of light reaching the photocell 15 from the electric bulb 18 through the coffee 9, as will be understood by those experienced in the electric art upon examination of FIG. 1 of the accompanying drawing and the reading of this specification.

Attention is directed at this time to FIG. 2 of the accompanying drawing. FIG. 2 is only a block diagram to illustrate the order of operation of the major components of the electric circuit, as will be understood by anyone experienced in the electrical arts. No further explanation of the contents of FIG. 2 is considered necessary nor mentioned elsewhere in this specification.

This novel invention of an electrically heated coffee pot is subject to any and all changes in detail and/or modifications one may care to make in so long as the changes and/or modifications fall within the scope and intent of the appended claims. The aforesaid coffee pot 5 can of course be replaced with a container having any configuration and one that is made from any suitable material. The container can have any desired substance placed therein that one may care to heat. The aforesaid hollow base 10 and its removable flat top 11 can be so constructed as to permit two or more coffee pots or containers to be placed thereon in so long as each pot or container has its own photocell and its associated electric components.

I claim:

1. Apparatus comprising:

a container for liquid having a hollow member extending from a portion thereof and substantially smaller than the remainder of the container, the hollow member being filled with whatever liquid is placed in the container, at least a portion of the hollow member being of a transparent material;

means for detecting the transmittancy of liquid in the hollow member, and generating output signals as a function of the transmittancy of the liquid;

means for shielding the detecting means from external light;

means for heating liquid in the container; and means for controlling the heating means in response to output signals from the detecting means.

2. Apparatus as recited in claim 1 wherein the hollow member is located along the lower portion of the container but above the bottom thereof, the hollow member having a capacity and width that is substantially smaller than that of the remainder of the container.

3. Apparatus as recited in claim 2 wherein the detecting means comprises a light source and a light detector, with the transparent portion of the hollow member interposed between the light source and detector.

4. Apparatus as recited in claim 3 wherein the transparent portion of the hollow member is substantially flat, so that light from the light source traverses the hollow member at an angle approximately perpendicular thereto.

5. Apparatus as recited in claim 3 wherein the heating means comprises an electrical heating element and the control means comprises electrical components selectively coupled between the light detector and the heating element, the apparatus further defined by a support for the container, the support comprising a hollow base having a movable top located thereon, the heating element located in the movable top directly under the container, the electrical components located in the hollow base.

6. Apparatus as recited in claim 5 wherein the shielding means comprises a vertically disposed portion of the hollow base on one side thereof that is provided with a horizontally disposed hollow recess and structure that embodies a hollow chamber in the top of the said vertically disposed portion of the hollow base, the light detector being located in the chamber.

7. Apparatus as recited in claim 6 wherein the light detector is a photocell.

8. Apparatus as recited in claim 6 wherein the light detector is a photoelectric device.

9. Apparatus as recited in claim 6 wherein the light source is mounted in the hollow base directly under the light detector, the hollow member of the container extending into the horizontally deposited recess in the vertically disposed portion of the hollow base between the light source and light detector when the container is located on the movable top; the apparatus further defined by two electric switches located inside of the hollow base for controlling the application of electrical energy to the apparatus, one of the switches being closed upon pressing down on the movable top with a predetermined amount of force, and opened upon removal of the force.

10. Apparatus as recited in claim 9 wherein the light source is an electric light bulb.

11. Apparatus as recited in claim 9 wherein the vertically disposed portion of the hollow base shields the light detector from external light, so that substantially all of the light incident to the light detector is from the light source via the transparent portion of the hollow member of the container.